(12) United States Patent
Roberts et al.

(10) Patent No.: US 7,450,899 B2
(45) Date of Patent: Nov. 11, 2008

(54) DEVICE AND METHOD FOR SAVING POWER DURING MONITORING OF A BROADCAST CHANNEL USING BROADCAST SCHEDULING INFORMATION

(75) Inventors: Michael Roberts, Reading (GB); Jean-Francois Labal, Reading (GB)

(73) Assignee: NEC Corporation, Tokyo (JP)

( * ) Notice: Subject to any disclaimer, the term of this patent is extended or adjusted under 35 U.S.C. 154(b) by 141 days.

(21) Appl. No.: 10/573,854

(22) PCT Filed: Oct. 1, 2004

(86) PCT No.: PCT/JP2004/014973

§ 371 (c)(1),
(2), (4) Date: Aug. 4, 2006

(87) PCT Pub. No.: WO2005/034534

PCT Pub. Date: Apr. 14, 2005

(65) Prior Publication Data

US 2007/0124774 A1    May 31, 2007

(30) Foreign Application Priority Data

Oct. 2, 2003    (GB)    ................................. 0323087.7

(51) Int. Cl.
     *H04H 20/71*    (2008.01)
(52) U.S. Cl. .................... 455/3.01; 455/412.2; 455/438
(58) Field of Classification Search ............... 455/3.01, 455/3.06, 3.03, 574, 414.3; 725/95, 97, 141, 725/153; 370/229
See application file for complete search history.

(56) References Cited

U.S. PATENT DOCUMENTS

| | | | |
|---|---|---|---|
| 5,878,033 A | 3/1999 | Mouly et al. | |
| 5,878,038 A | 3/1999 | Willey et al. | |
| 6,684,081 B2 * | 1/2004 | Sarkkinen et al. | ........... 455/515 |
| 6,826,408 B1 * | 11/2004 | Kim et al. | ................... 455/466 |
| 7,027,824 B2 * | 4/2006 | Fabien et al. | ................. 455/458 |
| 7,305,210 B2 * | 12/2007 | Kim | .......................... 455/3.06 |
| 7,308,278 B2 * | 12/2007 | Park | ............................ 455/503 |

(Continued)

FOREIGN PATENT DOCUMENTS

CN    1 287 423 A    3/2001

(Continued)

OTHER PUBLICATIONS

3GPP TR 25.992 V1.3.0, 3rd Generation Partnership Project; Technical Specification Group Radio Access Network; Multimedia Broadcast Multicast Service (MBMS); UTRAN/GERAN Requirements (Jan. 2003), pp. 1-11.*

(Continued)

*Primary Examiner*—Matthew Anderson
*Assistant Examiner*—Hai V Nguyen
(74) *Attorney, Agent, or Firm*—Sughrue Mion, PLLC

(57) ABSTRACT

Scheduling information related to the broadcast service is received otherwise than via a channel to be employed by the broadcast service. A start time of the broadcast service on the channel is determined. Preparation time of the broadcast service, which requires transmission on the channel prior to the start of the broadcast service, is determined. Monitoring of the channel until a time determined by the start time less the preparation time is inhibited.

14 Claims, 3 Drawing Sheets

U.S. PATENT DOCUMENTS

| | | | |
|---|---|---|---|
| 7,394,785 B2* | 7/2008 | Motegi et al. | 370/329 |
| 7,400,649 B2* | 7/2008 | Yi et al. | 370/469 |
| 2002/0026501 A1* | 2/2002 | Hoang | 709/219 |
| 2002/0051442 A1 | 5/2002 | Lee et al. | |
| 2002/0157104 A1* | 10/2002 | Nakada et al. | 725/97 |
| 2002/0175998 A1* | 11/2002 | Hoang | 348/148 |
| 2003/0078000 A1* | 4/2003 | Tatsumi et al. | 455/3.06 |
| 2003/0079223 A1* | 4/2003 | Galloway | 725/32 |
| 2003/0119533 A1* | 6/2003 | Sarkkinen et al. | 455/500 |
| 2003/0157949 A1* | 8/2003 | Sarkkinen et al. | 455/503 |
| 2003/0174645 A1 | 9/2003 | Paratainen et al. | |
| 2004/0087320 A1* | 5/2004 | Kim et al. | 455/458 |
| 2004/0105402 A1* | 6/2004 | Yi et al. | 370/312 |
| 2006/0107287 A1* | 5/2006 | Lee et al. | 725/32 |
| 2007/0124774 A1* | 5/2007 | Roberts et al. | 725/62 |
| 2008/0049697 A1* | 2/2008 | Breuer et al. | 370/341 |

FOREIGN PATENT DOCUMENTS

| | | |
|---|---|---|
| EP | 1 213 939 A | 6/2002 |
| WO | 02/082834 A | 10/2002 |
| WO | 03/015439 A | 2/2003 |

OTHER PUBLICATIONS

"3rd Generation Partnership Project; Technical Specification Group Radio Access Network; Radio Interface for Broadcast/Multicast Services (Release 1999)," Mar. 2001, pp. 1-31.

* cited by examiner

DEVICE AND METHOD FOR SAVING POWER DURING MONITORING OF A BROADCAST CHANNEL USING BROADCAST SCHEDULING INFORMATION

This application claims priority from PCT Application No. PCT/JP2004/014973 filed Oct. 1, 2004, and from British Application No. 0323087.7 filed Oct. 2, 2003, which applications are incorporated herein by reference.

TECHNICAL FIELD

The present invention relates to a mobile radio communications device and to a related method of operation and communication system including a network arrangement.

BACKGROUND OF THE INVENTION

An important requirement when seeking to reduce the size and weight, and also to increase operability, of a mobile radio communications device, relates to the power requirements of a device. If power requirements can be reduced then the useful lifetime of the device can be increased and/or the size of the device can likewise be reduced.

Recent attempts to reduce the power consumption within mobile radio communication devices have tended to employ the concept of discontinuous reception which generally allows for the device to remain active, but in a sleep or idle mode, and not requiring full access to the network nor the reception of signals therefrom.

Such discontinuous reception is known in Global System for Mobile Communications (GSM) devices and also in Universal Mobile Telecommunications System (UMTS) systems and which allows for the device to save power when in an idle mode since the device is not then required to continuously to receive downlink channels from the network.

Recent developments for mobile radio communication devices have included the provision of broadcast services such as Multimedia Broadcast Multicast Services (MBMS) which allow for the provision of specifically tailored information, i.e. news information and/or sport information, to be broadcast to a predetermined number of mobile communication devices, i.e. generally any such devices owned by users who have subscribed to a particular broadcast service.

For MBMS enabled devices, it is required that a notification channel to be employed by the broadcast service be read continuingly within the mobile device so as to achieve appropriate functionality.

Such functionality requires that the mobile communications device be informed when the MBMS sessions are to commence, and so that the device can be informed of the MBMS channel type, for example whether the channel type comprises a point-to-point channel type or whether it comprises a point-to-multipoint channel type. Also, the mobile communications device can learn from data on the notification channel whether the network needs counting such that, if counting is required, each mobile communications device subscribing to the service can declare itself to the cell of the devices that are to receive the MBMS session and the cell can then determine which channel to employ.

As will be appreciated from the above, current operation of a MBMS arrangement requires monitoring of the notification channel in order to receive the information available and such continuous monitoring of the notification channel disadvantageously increases the power consumption required at the mobile radio communications device even when the actual MBMS transmission is arranged to take place later. Thus, in view of such continuous monitoring, it is currently not viable for MBMS enabled devices to enter into a power-saving mode such as the discontinuous reception (DRX) arrangement noted above.

BRIEF DESCRIPTION

The present invention seeks to provide a mobile radio communications device, related method of operation and related communications system arranged for use with a broadcast service which have advantages over known systems as noted above.

In particular, the present invention proposes particular advantages allowing for aspects of power saving within devices and related systems allowing for broadcast sessions.

DETAILED DESCRIPTION OF THE INVENTION

Figure 2:
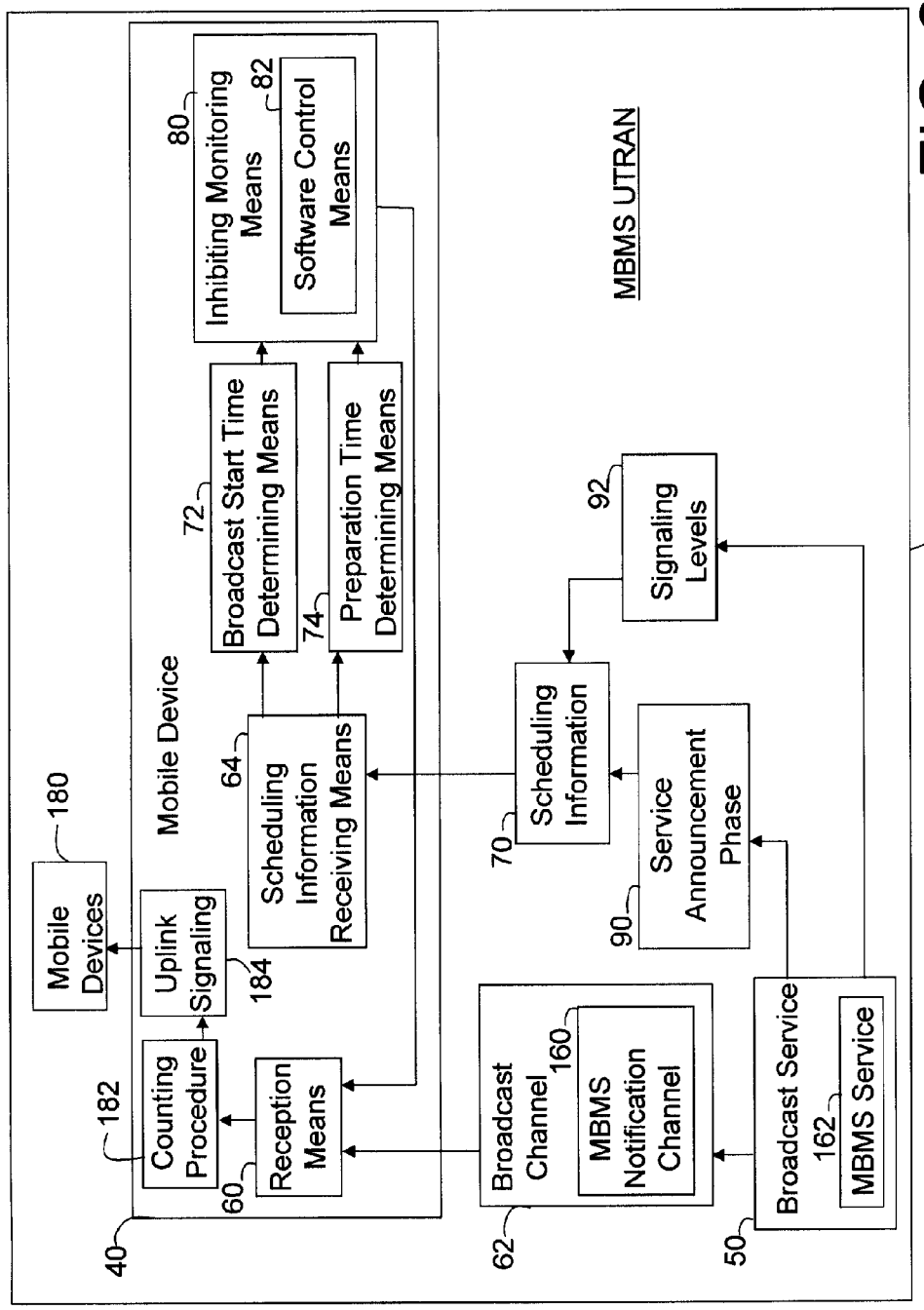
FIG. 2 is an illustration of a mobile device.

With reference to FIG. 2, a mobile radio communications device 40 is arranged for receiving a broadcast service 50 and includes reception means 60 for reading a channel 62 to be employed by the broadcast service 50, means 64 for receiving otherwise than via the channel 62 scheduling information 70 related to the broadcast service 50, means 72 for determining from the scheduling information 70 a start time of the broadcast service 50 on the channel 62, and means 74 for determining from the scheduling information 70 preparation time of the broadcast service 50 that requires transmission on the channel 62 prior to the start time of the broadcast service 50, and means 80 for inhibiting monitoring of the channel 62 at the reception means 60 until a time determined by the start time less the preparation time.

The present invention advantageously employs knowledge of the broadcast service transmission start time, and also a particular parameter related to the preparation time, so as to identify an appropriate time at which monitoring of the notification channel can be enabled so that all information related to the broadcast service to be commenced can be received at the mobile device.

Preferably, the means 80 for inhibiting monitoring of the channel comprises a software control means 82.

The scheduling information can advantageously be retrieved from data of a service announcement phase 90 supplied to the device 40 or from other signaling levels 92.

Preferably the data relating to the preparation time can be delivered to the device during a service announcement phase.

Figure 3:
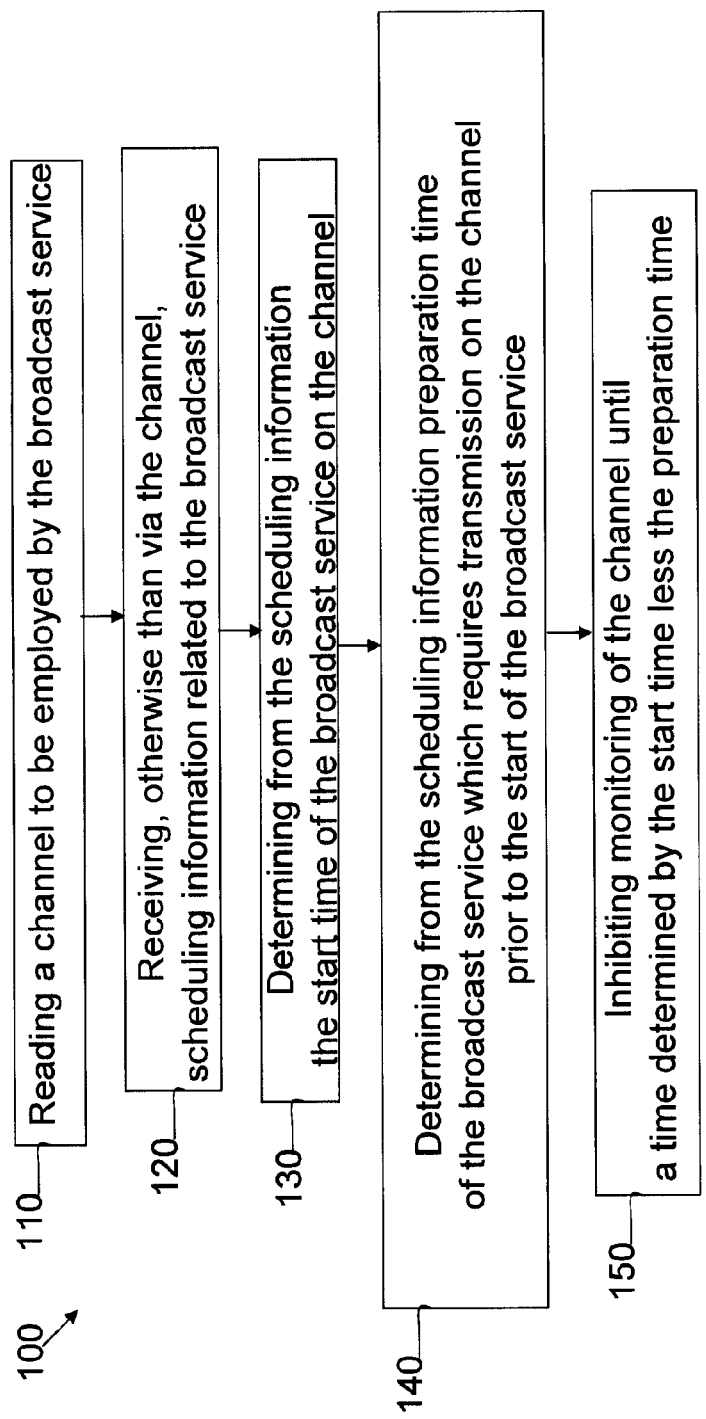
FIG. 3 is an illustration of a method of operating the mobile device of FIG. 1.

With reference to FIG. 3, there is provided a method 100 of operating a mobile radio communications device 40 arranged for receiving the broadcast service 50 and including:

Step 110: reading a channel to be employed by the broadcast service,

Step 120: receiving, otherwise than via the channel, scheduling information related to the broadcast service, Step 130: determining from the scheduling information the start time of the broadcast service on the channel, Step 140: determining from the scheduling information preparation time of the broadcast service, which requires transmission on the channel prior to the start of the broadcast service, and Step 150: inhibiting monitoring of the channel until a time determined by the start time less the preparation time.

The present invention therefore advantageously allows for a reduction in power consumption by allowing the mobile device 40 to operate without the need to read, for example, the MBMS notification channel 160 until the MBMS service 162 is about to commence.

Yet further advantages can arise insofar as the mobile device is arranged to trigger any uplink signaling required for the counting procedure in the network when the device starts to read the notification channel.

The invention is described further hereinafter, by way of example only, with reference to FIG. 1 which is a timing diagram illustrating the scheduling information flow between User Equipment (UE) and a related network in accordance with an embodiment of the present invention.

As noted above, the present invention proposes a reduction in power consumption within a mobile radio communications device 40 enabled for a reception of broadcast services and, in the illustrated example, such a service comprises MBMS 162. The control offered in accordance with the invention allows for the mobile device 40 not to read the MBMS notification channel 160 until the MBMS services are about to take place.

In order to determine the time at which monitoring of the notification channel should no longer be inhibited, an embodiment of the invention proposes the identification of the start time at which MBMS transmissions are to start on the channel and also, importantly, a parameter related to the preparation time within the Universal Terrestrial Radio Access Network (UTRAN) 170. The information relating to such preparation time, as with the start time, maybe supplied to the mobile device during a service announcement phase. Within the device, the MBMS UTRAN preparation time identified is subtracted from the MBMS transmission start time in order to arrive at a time at which the mobile terminal should commence monitoring of the notification channel in order to receive all the required MBMS notification data.

The software arrangement within a software model within the higher layers, for example the application layer or middle layer, within the device can advantageously be employed to use the information noted above, i.e. the MBMS transmission start time and MBMS UTRAN preparation time. The invention can then provide for an accurate control of the disabling/enabling of the monitoring of the notification channel and which leads to the power-saving advantages exhibited in accordance with the present invention.

With regard to the parameter now identified as MBMS UTRAN preparation time, it is noted that such preparation time is generally required by the UTRAN for counting the number of mobile devices 180 within the MBMS service area and, in accordance with a particular advantage, the triggering of the counting procedure 182 can be initiated at the mobile device 40 allowing for the device 40 to trigger the uplink signaling 184 required for the aforesaid counting when the device 40 starts to read the MBMS notification channel 160.

Figure 1:
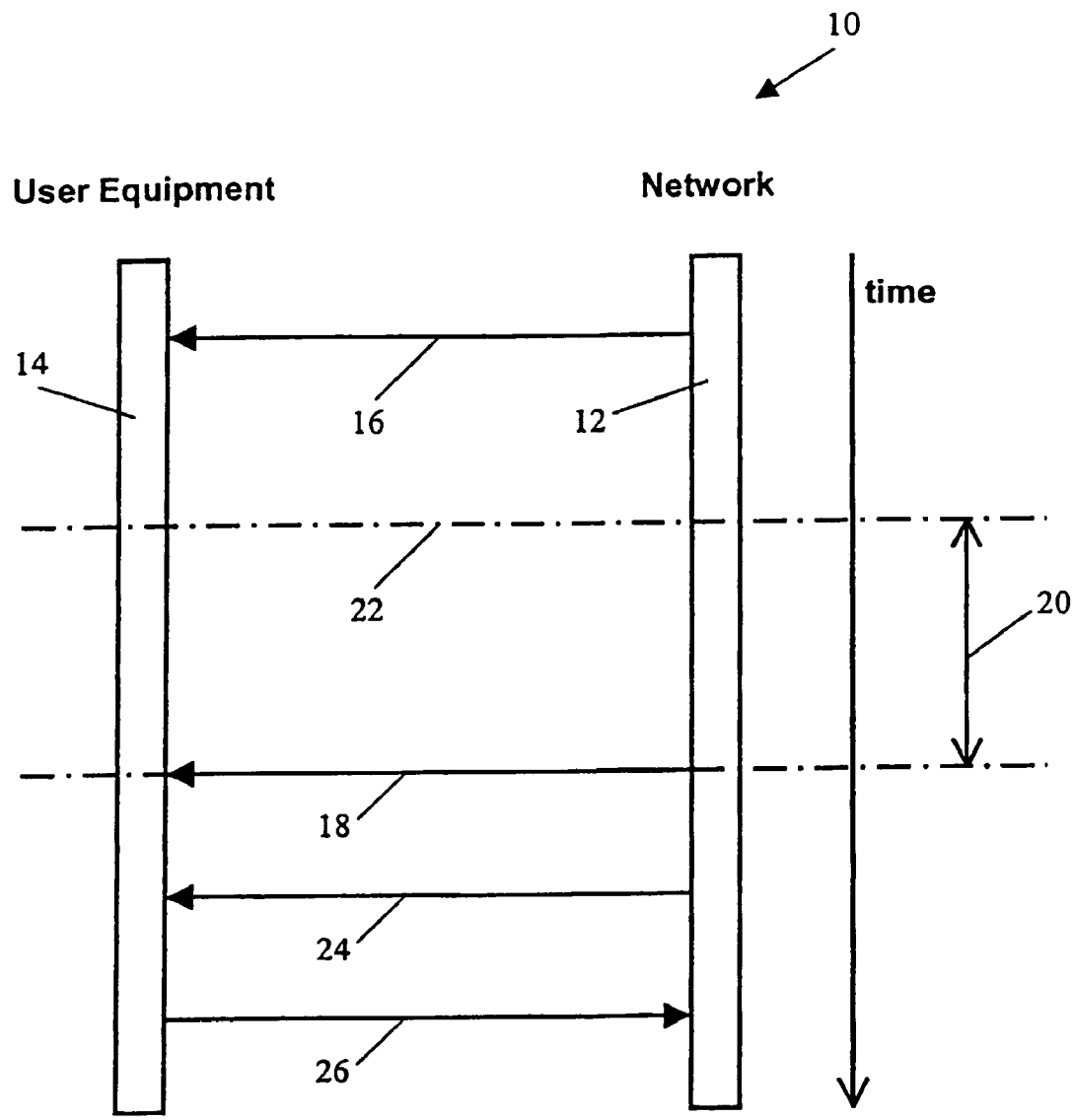
FIG. 1 is a timing diagram showing the timing of the various events in transmission between a network and user equipment.

Turning now to FIG. 1, an embodiment of the present invention is described further.

FIG. 1 illustrates a timing diagram relating to transmissions within a communications network 10 and between a network 12 and user equipment 14 such as a mobile phone.

The vertical axis of the diagram in a direction running from the top of the diagram relates to elapsing time.

The operation within the device 14 commences with a service announcement 16 issued by the network 12 although the information could be provided over other signaling levels, and within the service announcement 16 there is provided data relating to the MBMS transmission start time and the MBMS preparation time.

The MBMS transmission start time will identify the time 18 at which data transfer is due to commence as part of the MBMS session although, as noted above, the user equipment 14 will have to commence monitoring of the notification channel at an earlier time than this so as to receive all data relating to the required MBMS preparation so as to allow for, for example, the counting procedure if required as noted above.

Once the MBMS preparation time period 20 has been identified for the user equipment 14, then a software module within the user equipment, and generally provided at a higher level such as within the application or middleware layers, serves to determine the exact time 22 at which monitoring of the notification channel should commence, and which is prior to the transmission start time 18 by a time period equivalent to the MBMS preparation time 20. Thus, the MBMS session is effectively enabled at 22 so that all data relating to the MBMS preparation, and the subsequent data transfer is received by the user equivalent 14.

Subsequent to the start of the data transfer 18, data such as an MBMS bearer release 24 and the user equipment leaving signal 26 is transmitted between the network 12 and user equipment 14.

The present invention advantageously leads to the adjustment of the content of the MBMS signaling and the implementation of the above-mentioned software module on the terminal side in order to schedule the MBMS notification channel monitoring based on both the MBMS transmission start time and the MBMS preparation time parameters.

It should of course be appreciated that the present invention is not restricted to the details of the foregoing embodiment.

For example, the data relating to the MBMS transmission start time may be provided over other signaling levels than the service announcement phase although it is important that the broadcast service includes scheduling information relating to an at least informal estimate of when the particular broadcast service is due to commence.

Through the above-mentioned control of the enabling disabling of monitoring of the notification channel, a mobile radio communications device arranged for use with broadcast services such as MBMS can advantageously also exhibit power-saving characteristics such as those arising with DRX arrangements.

The invention claimed is:

1. A mobile radio communications device arranged for receiving a broadcast service, including:
reception means for reading a channel to be employed by the broadcast service,
means for receiving, otherwise than via the channel, scheduling information related to the broadcast service from a service announcement phase,
means for determining from the scheduling information a start time of the broadcast service on the channel,
means for determining from the scheduling information preparation time of the broadcast service that requires transmission on the channel prior to the start time of the broadcast service, and
means for inhibiting monitoring of the channel at the reception means until a time determined by the start time less the preparation time.

2. A device as claimed in claim 1, wherein the means for inhibiting monitoring of the channel comprises a software control means.

3. A device as claimed in claim 1 or 2, wherein the preparation time includes time required by the network for counting a number of mobile devices requiring receipt of the broadcast service.

4. A device as claimed in claim 3, which is arranged to trigger uplink signal relating to counting upon commencement of monitoring of the channel.

5. A device as claimed in claim 1 or 2 wherein the broadcast service comprises a MBMS service.

6. A device as claimed in claim 5, wherein the channel comprises a MBMS notification channel.

7. A device as claimed in claim 1 or 2, embodied in a cellular phone.

8. A mobile radio communications device arranged for receiving a broadcast service, comprising:
- reception means for reading a channel to be employed by the broadcast service,
- means for receiving, otherwise than via the channel, scheduling information over signaling levels provided by the broadcast service, which signaling levels are different from a service announcement phase,
- means for determining from the scheduling information a start time of the broadcast service on the channel,
- means for determining from the scheduling information preparation time of the broadcast service and requiring transmission on the channel prior to the start time of the broadcast service, and
- means for inhibiting monitoring of the channel at the reception means until a time determined by the start time less the preparation time.

9. A method of operating a mobile radio communications device arranged for receiving a broadcast service and including:
- reading a channel to be employed by the broadcast service,
- receiving, otherwise than via the channel to be employed by the broadcast service, scheduling information related to the broadcast service from at least one of a service announcement phase or signaling levels,
- determining from the scheduling information a start time of the broadcast service on the channel,
- determining from the scheduling information preparation time of the broadcast service that requires transmission on the channel prior to the start of the broadcast service, and
- inhibiting monitoring of the channel until a time determined by the start time less the preparation time.

10. A method as claimed in claim 9, wherein inhibiting monitoring comprises:
- inhibiting monitoring with software control means.

11. A method as claimed in claim 9 or 10, wherein the time preparation includes time required by a network for counting a number of mobile devices requiring receipt of the broadcast service.

12. A communication system comprising a network including the mobile radio communications device as defined in claim 1 or 2.

13. A system as claimed in claim 12, wherein the network comprises a MBMS UTRAN.

14. A communication system comprising the mobile radio communications device of claim 1.

* * * * *